US 8,674,874 B2

(12) United States Patent
Soualle et al.

(10) Patent No.: US 8,674,874 B2
(45) Date of Patent: Mar. 18, 2014

(54) METHOD AND DEVICE FOR CALIBRATING AN ARRAY ANTENNA

(75) Inventors: Francis Soualle, Munich (DE); Helmut Wolf, Holzkirchen (DE)

(73) Assignee: Astrium GmbH, Taufkirchen (DE)

( * ) Notice: Subject to any disclaimer, the term of this patent is extended or adjusted under 35 U.S.C. 154(b) by 464 days.

(21) Appl. No.: 12/678,110

(22) PCT Filed: Sep. 17, 2008

(86) PCT No.: PCT/EP2008/007751
§ 371 (c)(1),
(2), (4) Date: Sep. 20, 2011

(87) PCT Pub. No.: WO2009/040038
PCT Pub. Date: Apr. 2, 2009

(65) Prior Publication Data
US 2012/0001810 A1    Jan. 5, 2012

(30) Foreign Application Priority Data
Sep. 24, 2007 (EP) .................................... 07291130

(51) Int. Cl.
*G01S 7/40* (2006.01)
(52) U.S. Cl.
USPC ........................................ 342/174; 342/189
(58) Field of Classification Search
USPC ................................................ 342/174, 189
See application file for complete search history.

(56) References Cited

U.S. PATENT DOCUMENTS

| 4,894,842 | A | * | 1/1990 | Broekhoven et al. ......... 375/150 |
| 5,515,056 | A | * | 5/1996 | Henderson et al. ........... 342/125 |
| 5,530,449 | A | | 6/1996 | Wachs et al. |
| 5,751,244 | A | * | 5/1998 | Huston et al. ............ 342/357.24 |
| 7,292,877 | B2 | | 11/2007 | Yoon et al. |
| 7,388,541 | B1 | * | 6/2008 | Yang ............................. 342/464 |
| 7,532,159 | B2 | * | 5/2009 | Zhi et al. .................. 342/357.62 |
| 7,626,544 | B2 | * | 12/2009 | Smith et al. .................... 342/386 |
| 2008/0303742 | A1 | * | 12/2008 | Dybdal et al. ................ 343/893 |
| 2008/0309552 | A1 | * | 12/2008 | Alexander ............... 342/357.15 |
| 2012/0001810 | A1 | * | 1/2012 | Soualle et al. ................ 343/703 |
| 2012/0033540 | A1 | * | 2/2012 | Kim et al. ..................... 370/203 |

FOREIGN PATENT DOCUMENTS

| EP | 0713261 A1 | 5/1996 |
| EP | 0881704 A2 | 12/1998 |
| EP | 2040333 A1 * | 3/2009 ............... H01Q 3/26 |
| GB | 2342505 A | 4/2000 |
| WO | WO 03090386 A1 | 10/2003 |

OTHER PUBLICATIONS

European Search Report for EP07291130 mailed on Feb. 20, 2008.
International Search Report for PCT/EP2008/007751 mailed on Oct. 23, 2008.

* cited by examiner

*Primary Examiner* — John B Sotomayor
(74) *Attorney, Agent, or Firm* — Leydig, Voit & Mayer, Ltd.

(57) ABSTRACT

A method for calibrating an array antenna having a plurality of branches includes generating a test signal using a pseudo-random sequence assigned to one of the plurality of branches for each of the plurality of branches; adding the test signals to a useful signal of the antenna so as to form a summed signal emitted via the array antenna; receiving the summed signal with a receiver antenna; correlating the received summed signal with a replica of the pseudo-random sequence so as to produce a correlation result; estimating a characteristic of one of the plurality of branches by processing the correlation result; and calibrating the antenna based on the estimated characteristic.

18 Claims, 4 Drawing Sheets

METHOD AND DEVICE FOR CALIBRATING AN ARRAY ANTENNA

This application is a U.S. National Phase Application under 35 U.S.C. §371 of International Application No. PCT/EP2008/007751, filed on Sep. 17, 2008, which claims priority to European Application No. EP 07 2911 30.8, filed Sep. 24, 2007. The International Application was published in English on Apr. 2, 2009 as WO 2009/040038 under PCT Article 21 (2).

The invention relates to a method and device for calibrating an array antenna.

BACKGROUND

Array antennas are used for example in satellites of a satellite system for worldwide navigation (GNSS; GNSS=Global Navigation Satellite System), such as the currently constructed European satellite navigation system, better known under the name "Galileo", in satellite-based imaging radar systems employing Synthetic-Aperture-Radar (SAR) sensors or in Telecommunication satellites. In order to control the antenna excitation, the characteristics of each branch of the distribution network and array radiator elements of the array antenna must be known. Typical parameters describing the characteristics are the propagation time, the phase and the magnitude of a signal propagating through each branch of the array. The characteristics may be used to calibrate the different paths or branches of an array antenna, thus enabling an improved control of the excitation. Usually, an estimation or determination of the characteristics and a calibration cannot be performed during normal operation of an antenna, since this requires emitting special test or calibration signals, which would interrupt the normal operation. This aspect is particular important in case of a GNSS, where the system requirements of operational continuity are usually mandatory.

SUMMARY OF THE INVENTION

It is an aspect of the present invention to provide a method and device for calibrating an array antenna, without degrading significantly the performance of the system. Furthermore, it allows a continuous operation of the antenna.

A basic idea of the invention is to generate a test signal by using a pseudo-random sequence, or also called a pseudo-noise sequence, assigned to a certain branch, and to add in this branch the generated test signal to a useful signal. The summed signal may then be emitted via the array antenna. This will allow the estimation of the characteristics of the corresponding branch by receiving and analyzing the emitted summed signal. This may be applied to one specific branch, a group of branches or all branches of the array antenna, according to the objective of the calibration performance to be expected (precision and calibration duration). A calibration of the antenna, particularly of the excitation coefficients of the antenna, may then be performed based on the estimated characteristics. An essential advantage of the invention is the ability to be used during normal operation, i.e. without the need to interrupt the continuous operation for testing or calibration purposes, since the test signal is added to the useful signal. Thus, the invention is particularly suitable to be applied to a GNSS, since it may preserve a continuous service. The information obtained from the estimation of these characteristics can be directly used for example on-board (fast or in real time) to correct or compensate the excitation coefficients of the array antenna, thus allowing a kind of calibration of the antenna. It should be noted that the invention may be applied to both an active and a passive antennae. Furthermore, the invention is especially advantageous for the calibration of transmit array antennae.

An embodiment of the invention provides a method for calibrating an array antenna, comprising—generating a test signal by using a pseudo-random sequence assigned to a certain branch, adding the generated test signals in the different branches of the array to a useful signal, which leads to a summed signal to be emitted via the array antenna, receiving the summed signal with a receiver antenna, correlating the received summed signal with a replica of the pseudo-random sequence identical to this used for the generation of the test signal, estimating the characteristics of the branch by processing the correlation result, and calibrating the antenna based on the estimated characteristics.

This method may be, for example, embodied in a satellite of a GNSS, in a SAR sensor or in a telecommunication satellite and allows calibrating the array antenna, particularly the excitation coefficients.

For this invention, a useful signal means the signal which is transmitted by the array antenna in order to achieve a service. For example, in the frame of the GNSS, the useful signals are the CDMA spread signals carrying the information on the satellite position and time to the user.

According to a further embodiment of the invention, the pseudo-random sequences assigned to the different branches may be selected such that they show good correlation properties between each other but also with the useful signal. Good correlation properties means that the correlation between two different pseudo-random sequences, or between each of these pseudo-random sequences and the useful signal, is zero, or at least negligible. These correlation properties will ensure a good isolation for the effects of the useful or of the other test signals than the test signal dedicated to a specific branch of the distribution network, at the correlator output dedicated to this specific branch. This allows performing the estimation of the characteristics of several branches in parallel and, thus, a very efficient estimation in a short time.

According to a yet further embodiment of the invention, the distribution network may comprise M branches, a pseudo-random sequence may comprise N chips, and N may be selected according to the following relation: N≥M. This offers favorable correlation properties between the corresponding set of M pseudo-random sequences. Each chip has duration $T_c$.

In a further embodiment of the invention, pseudo-random sequences assigned to different branches may be selected from a Walsh family of pseudo-random sequences or from a family of pseudo-random sequences based on the use of m-sequences.

In a yet further embodiment of the invention, the useful signal may contain symbols to be transmitted and the symbol duration $T_s$ of the useful signal should be selected as a multiple of the chip duration $T_c$: $T_s = P \, T_c$.

According to an embodiment of the invention, the leading edge of the first chip of a pseudo-random sequence of the test signal should be synchronized with the leading edge of a pulse, used for modulating symbols of the useful signal.

According to a further embodiment of the invention, the power of a test signal may be selected such that it is negligible compared to the power of the useful signal. Thus, the impact onto the performance of a system employing an array antenna and an embodiment of the inventive method is negligible.

In a further embodiment of the invention, the amplitude of the chips of a pseudo-random sequence is selected much smaller than the amplitude of the useful signal. This allows neglecting the power of the test signal with regard to the useful signal and, thus, the impact onto the system's performance.

According to an embodiment of the invention, a balanced pseudo-random sequence may be selected as a pseudo-random sequence. Thus, the pulse shape of a symbol of the useful signal may lead to a negligible cross-correlation with the pseudo-random sequences, especially in the case of an infinite or a very large transmission bandwidth. A balanced pseudo-random sequence means as many +1 chips as −1 chips are contained in the pseudo-random sequence.

Furthermore, in an embodiment of the invention, the first chip of the replica of the pseudo-random sequence used for generating the replica signal in the correlator should be synchronized with the first chip of the pseudo-random sequence corresponding to the branch to be calibrated, and included in the received summed signal provided to the correlation unit. This synchronization could be achieved, for example, with a Delay Lock Loop (DLL).

According to an embodiment of the invention, the processing of the correlation result may comprise deducing the code delay, the propagation losses and the phase of the excitation coefficients of the certain branch. Group delay, particularly the delay of signal propagation time through a branch, and losses and error phase shifts, particularly the deviation of the signal's amplitude and phase, are essential characteristics of a branch of the antenna, particularly for calibrating the antenna, for example for controlling the excitation of the antenna. Group delay can be derived from the comparison between the time of correlation peak with the reference time of the generation unit of the useful signal (itself synchronized with the time of test signal generation unit, as explained from an earlier embodiment). The losses can be derived from the measurement of the amplitude for the correlation peak. The phase of the excitation coefficient can be derived from the measure of the phase of the correlation peak.

According to a yet further embodiment of the invention, the delay and the losses in the receiver path starting from receiver antenna output to correlator input may be deduced by switching the pseudo-random sequence used for generating the test signal to the input of the receiver path, correlating the pseudo-random sequence, switched to the input of the receiver path, with a replica of the pseudo-random sequence, and deducing the delay and the losses in the receiver path by processing the correlation result.

Delays and losses in the receiver path may have an impact on the main deduction of characteristics (delay and losses and phase shift for the branches of the array antenna) and, thus, should be eliminated or even compensated. Thus, the deduction of the receiver path's delays and losses may help to deduce the main characteristics with a higher accuracy.

According to an embodiment of the invention suitable for internal calibration, the pseudo-random sequences may be selected such that the cross-correlation between the different pseudo-random sequences is null or negligible provided that the first chip of all pseudo-random sequences starts at nearly the same time, and the shape of a pulse of the useful signal leads to a zero or negligible cross-correlation with the pseudo-random sequences when synchronized.

According to a further embodiment of the invention, the test signal can be selected such that its bandwidth is limited with the same bandwidth as the useful signal to be emitted. This is particularly the case when the frequency bandwidth of the summed signal (test and useful), transmitted by the array antenna can not exceed a specific value in order not to overlap with other frequency bands dedicated to other systems (regulatory aspects). In this case, an alternative embodiment of the invention is proposed.

According to an alternative embodiment of the invention suitable for internal calibration, when the bandwidth of the test and useful signals are identical, the test signal may be selected such that it comprises pulses with the same pulse shape than the pulses contained in the useful signal, and it is generated with a pseudo-random sequence assigned to a certain branch, wherein the pseudo-random sequence is selected to be orthogonal to the pseudo-random sequences assigned to the other branches and to the pseudo-random sequence assigned to the useful signal.

According to a yet further embodiment of the invention, the adding of the generated test signal to the useful signal may be performed by mixing the signals at RF by means of a coupler in order to avoid any feedback from the test signal into the transmission chain of the useful signal.

According to a yet further embodiment of the invention, the receiver antenna may be located such close to the array antenna that the aperture coupling between the array antenna and the receiver antenna is used in order to get sufficiently power of the emitted summed signal for further processing. The use of a boomer, where the receiver antenna would be fixed at its top and would point towards the array antenna, could be considered as a candidate possibility.

According to a yet further embodiment, the position of the receiver antenna with respect to the array antenna should be chosen in order not to disturb the radiation characteristics of the array antenna. A candidate solution which would be especially advantageous would consist to position it co-planarly and at the edge of the array. Co-planar means that that the aperture of the receiver antenna will be located in approximately the same plan as this of the array antenna and both antennae are pointing towards the same direction. Furthermore, it would be also advantageous to locate the receiver antenna close to the array in order to have the same effects from temperature stability and also a better HW (Hardware) equipment accommodation.

According to a further embodiment of the invention, a computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention provides a device for estimating characteristics of branches of the distribution network of an array antenna, comprising a test signal generation unit being adapted for generating a test signal by using a pseudo-random sequence assigned to a certain branch, adders provided for each branch and being adapted for adding the generated test signal to a useful signal to be emitted as summed signal via the array antenna, a receiver antenna being provided for receiving the summed signal, a replica generator being adapted for generating a replica of the pseudo-random sequence processing means being adapted for correlating the received summed signal with the generated replica, for estimating characteristics of the branch by processing the correlation result, and for calibrating the antenna based on the estimated characteristics.

A further embodiment of the invention provides a device, further comprising a switching process between the test signal generation unit and the receiver path (starting at the receiver antenna output).

According to an embodiment of the invention, the device may be adapted to perform a method according to the invention.

A further embodiment of the invention relates to a satellite, particularly adapted for usage with a GNSS or as SAR sensor, wherein the satellite comprises an array antenna and a device according to the invention and as described before.

These and other aspects of the invention will be apparent from and elucidated with reference to the embodiments described hereinafter.

BRIEF DESCRIPTION OF THE DRAWINGS

The invention will be described in more detail hereinafter with reference to exemplary embodiments. However, the invention is not limited to these exemplary embodiments.

DETAILED DESCRIPTION

In the following description, absolute values may be contained. These absolute values are only exemplary values and do not restrict the scope of the present invention.

Figure 1:
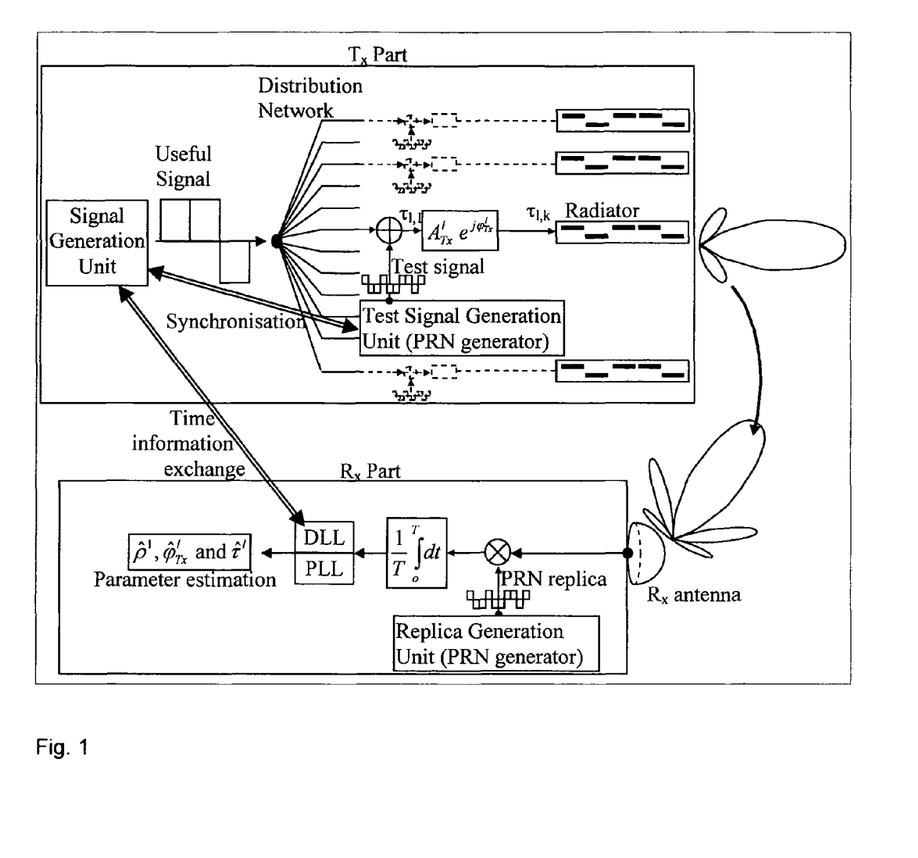
FIG. 1 shows the transmit and receiver paths for the internal calibration of an embodiment of an array antenna according to the invention.

FIG. 1 depicts an array antenna (denoted as $T_x$ part) for the transmission (including the distribution network and the radiators for the case of an active antenna) together with a receiver antenna and signal processing chain (denoted as $R_x$ part) used for the estimation of the characteristics of the antenna and the calibration.

Also, the phase shifter and active amplitude modulation elements for the branch of the antenna ($A_{Tx}^l e^{j\Phi_{Tx}^l}$) are depicted in FIG. 1. The corresponding amplitude can be obtained with, for example, a variable gain amplifier (VGA). The propagation delays, $\tau_{l,k}$ (where k stands for the index of the $k^{th}$ contribution to the overall propagation delay of the $l^{th}$ branch) have also been represented.

Each branch of the antenna contains an adder, which adds a pseudo-noise sequence, which is assigned to the respective branch, as test signal, to the useful signal, which should be emitted via the radiator of a branch.

The different pseudo-noise sequences of the branches are generated with a PRN (Pseudo Random Noise) generator. The PRN generator comprises all pseudo-noise sequences, which are assigned to the different branches of the distribution network of the array antenna. Each branch has its own dedicated PRN sequence.

The $R_x$ part comprises a receiver antenna, which is located in the neighbourhood of the emitting array antenna. Any signal received via the receiver antenna is supplied to a correlator, which correlates the received signal with a pseudo-noise sequence, called replica, which is generated by a PRN generator of the $R_x$ part. Therefore, the PRN generator of the $R_x$ part can generate replicas of the pseudo-noise sequences identical to the PRN generator of the $T_x$ part. Furthermore, the synchronization between the replica and the desired pseudo-noise sequence within the received signal can be achieved, for example, by the mean of a Delay Lock Loop.

In the following, the internal calibration principle as applied in the arrangement from FIG. 1 is described in detail. The following different parameters are used for the intra-calibration mechanism.

Parameters for the Antenna

M denotes the number of radiators, equal to the number of branches for the distribution network.

Parameters for the Pseudo-Random Sequences $PN^l$ is the $l^{th}$ spreading, i.e. pseudo-noise sequence used for the calibration of $l^{th}$ branch N is the number of chips within the pseudo-random sequence. N is supposed identical for all $PN^l$ sequences. Note that N should be at least equal to the number of radiators M in order to offer favourable correlation properties between the corresponding set of M pseudo-random sequences:

$N \geq M$ $c_i^l$ denotes the $i^{th}$ chip of the $PN^l$ pseudo-random sequence.

$p_{cal}(t)$ denotes the pulse shape which will modulate each chip of the $PN^l$ sequence. Its duration is $T_c$. The associated chip rate is $f_c = 1/T_c$.

$$\begin{cases} p_{cal}(t) \neq 0 & \text{for } 0 \leq t \leq T_c \\ 0 & \text{elsewhere} \end{cases}$$

$A_{cal}^l$ represents the amplitude of the pseudo-random sequence for the $l^{th}$ branch. It may be different according to the branch (related to amplitude of the excitation coefficient to be estimated, $A_{Tx}^l$).

With the previous notations, the pseudo-random sequence for the $l^{th}$ branch is given by:

$$PN^l(t) = A_{cal}^l \sum_{i=1}^{N} c_i^l p_{cal}(t - iT_c)$$

Parameters for the Useful Signal $T_s$ is the duration of any symbol transmitted within the useful signal.

$p_s(t)$ is the pulse shape used to modulate the symbol. For an infinite transmitter bandwidth, $p_s(t)$ can be considered for example as the RECT function:

$$\begin{cases} p_s(t) = 1 & \text{for } 0 \leq t \leq T_s \\ 0 & \text{elsewhere} \end{cases}$$

Figure 2:
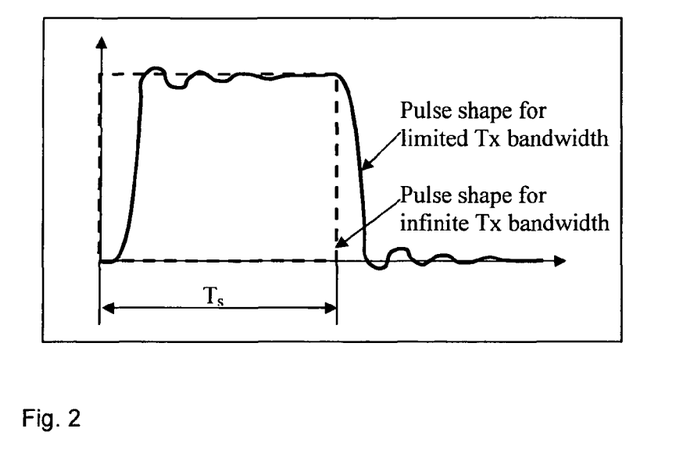
FIG. 2 shows an embodiment of a pulse shape for the symbol modulation according to the invention. Two cases are considered for the transmit bandwidth (infinite, or very large, and limited transmit bandwidth)

However for a limited transmitted bandwidth, the corresponding pulse shape will show ripples of decreasing amplitude, together with a finite slop of the leading edge as shown in FIG. 2.

Note that in the case of a finite transmission bandwidth, it is possible that the amplitude for each chip may be different: $A_{cal,i}^l \neq A_{cal,j+k}^l$ k>1, in order to obtain a better orthogonality between the pulse shape of the transmitted useful signal and this of the test signal.

$\omega_c$ denotes the carrier frequency $s(t)$ is the symbol stream which is composed of a succession of binary symbols.

$A_{Tx}$ represents the amplitude of the useful signal provided at the array branch input Parameters for the Array Antenna $A_{Tx}^l$ represents the amplitude of the excitation coefficient for the $l^{th}$ branch $\phi_{Tx}^l$ represents the phase of the excitation coefficient for the $l^{th}$ branch Parameters to be Estimated $\tau^l(t)$ denotes the total group delay obtained by accumulating the elementary delays for the different elements of the $l^{th}$ branch (cables, amplifiers, phase shifter, radiators).

$\rho^l(t)$ is a parameter representative of the total power loss obtained by accumulating the elementary losses for the different elements of the $l^{th}$ branch (cables, amplifiers, phase shifter, radiators). Without losses, $\rho^l = 1$.

The phase of the excitation coefficient $\phi_{Tx}^l$

Furthermore, the following conditions should be fulfilled:

1. The leading edge for the first chip of the pseudo-random sequence is synchronised with the leading edge of the pulse which modulates the useful signal.
2. The chip rate is a multiple of the symbol rate: $T_s = P \cdot T_c$ with P is a multiple of the pseudo-random sequence length: K=Q·N with Q≥1.
3. The amplitude of the chip is much smaller than the amplitude of the useful signal in order not to degrade the system performance (negligible for a receiver located on the earth). When applying this property at the level of the $l^{th}$ branch, it means that $A_{cal}^l \ll A_{Tx}$
4. The first chip of the replica sequences used in the correlator is synchronised with the first chip of the pseudo-random sequences, used in the distribution network, and are received in the receiver path. To achieve this property a Delay Lock Loop (DLL) could be used.
5. When synchronised (meaning that the first chip of all sequences starts at the same time), the corresponding pseudo-random sequence cross-correlation is null:

$$\frac{1}{NT_c} \int_0^{NT_c} PN^l(t) \cdot PN^p(t) \, dt = 0 \quad \text{(with } l \neq p\text{)}$$

6. When synchronised, the pulse shape of the useful symbol, $p_s(t)$ leads to a zero cross-correlation with the pseudo-random sequences:

$$\frac{1}{NT_c} \int_0^{NT_c} PN^l(t) \cdot p_s(t) \, dt = 0$$

Figure 3:
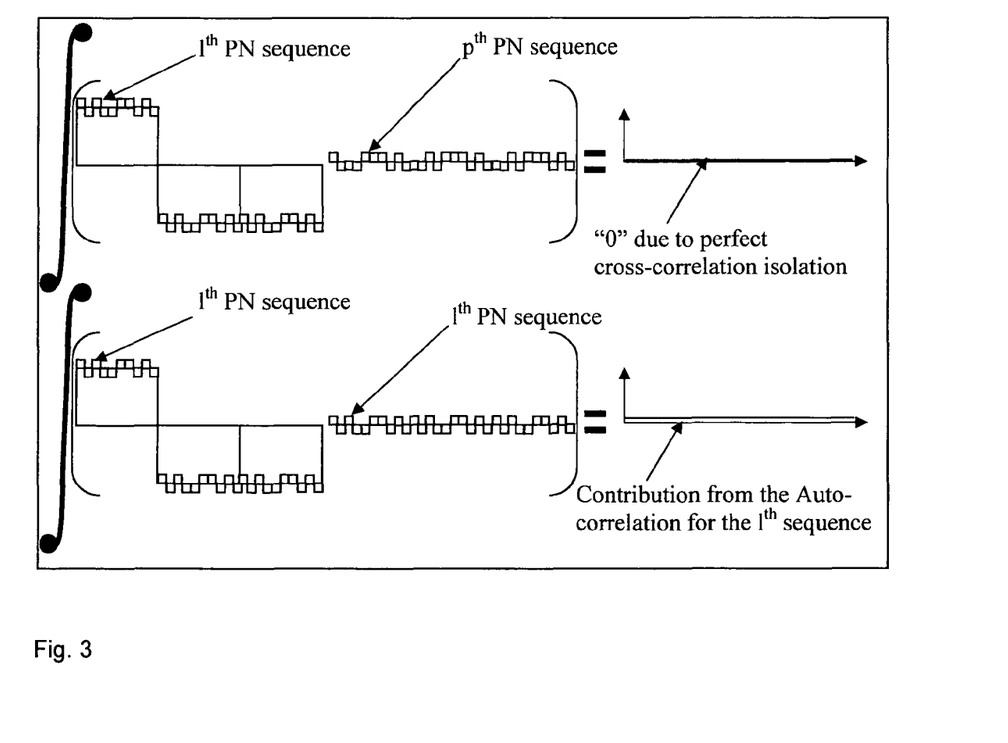
FIG. 3 shows the principle of orthogonality between the pseudo-random sequences and the pulse shape, but also the orthogonality for pseudo-random sequences between each other (upper case, the replica is different to one of the M pseudo-random sequences, lower case the replica is identical to one of the M pseudo-random sequences) according to the invention.

Such a property can be achieved by using a balanced pseudo-random sequence (as many +1 chips as −1 chips, as shown on FIG. 3 (in case of an infinite or at least very large transmit bandwidth).

7. The transmitted bandwidth is considered infinite or at least very high.

In the following, the calibration procedure is described:

During the transmission of each pulse of the useful signal, the output of the antenna can be described as:

$$Z(t) = \sum_{l=1}^{M} \left\{ \begin{array}{l} \rho^l A_{Tx} \cdot A_{Tx}^l e^{j[2\pi\omega_c(t-\tau^l)+\phi_{Tx}^l]} \cdot s(t-\tau^l) \cdot p_s(t-\tau^l) + \ldots \\ \left( \sum_{i=1}^{N} \rho^l A_{cal}^l A_{Tx}^l e^{j[2\pi\omega_c(t-\tau^l)+\phi_{Tx}^l]} c_i^l p_{cal}(t - iT_c - \tau^l) \right) \end{array} \right\}$$

In the previous expression, the same group delay $\tau^l(t)$ and the losses $\rho^l(t)$ of the $l^{th}$ branch affect both the useful and the calibration or test signals for the $l^{th}$ path. Note also that the amplitude of excitation coefficient for the $l^{th}$ branch, $A_{Tx}^l$, will be applied to both the amplitude $A_{Tx}$ of the useful signal at the branch input and the amplitude of the test signal, $A_{cal}^l$.

The corresponding signal shows a decrease of its power, at the receiver antenna input, due to:

the free space propagation losses inversely proportional to the distance, at a specific exponent, between the transmitter and receiver antennae. The exponent depends on the corresponding distance (near/far wave propagation).

the gain for the transmitter and receiver antenna (aperture coupling)

The signal at the output of the receiver antenna is denoted:

$$Y(t) = \sum_{l=1}^{M} \left\{ \begin{array}{l} \rho^l B_{Tx}^l e^{j[2\pi\omega_c(t-\tau^l-\tau_{tx\_rx}^l)+\phi_{Tx}^j]} \cdot \\ s(t-\tau^l-\tau_{tx\_rx}^l) \cdot p_s(t-\tau^l-\tau_{tx\_rx}^l) + \ldots \\ \left( \sum_{i=1}^{N} \rho^l B_{cal}^l e^{j[2\pi\omega_c(t-\tau^l-\tau_{tx\_rx}^l)+\phi_{Tx}^l]} c_i^l p_{cal}(t - iT_c - \tau^l - \tau_{tx\_rx}^l) \right) \end{array} \right\}$$

Where $\tau_{tx\_rx}^l$ represents the propagation delay between the transmitter and the receiver antennae, which can be estimated on-ground since the distance for this path is perfectly known.

$B_{Tx}^l$ and $B_{cal}^l$ are proportional to $A_{Tx} \cdot A_{Tx}^l$ and $A_{cal}^j \cdot A_{Tx}^l$. The proportionality coefficient is equal to the combined effect of the aperture coupling and the free space propagation loss between the two antennae. This coefficient can be also calibrated on-ground:

$$\left( \frac{B_{Tx}^l}{A_{Tx} \cdot j \cdot A_{Tx}^l} \right)^u = \left( \frac{B_{Tx}^l}{A_{Tx} \cdot j \cdot A_{Tx}^l} \right)^u = K^l \quad \text{(often } u = 2\text{)}$$

Note that the path losses for the $l^{th}$ branch, $\rho^l$, have not been included in the amplitude $B_{Tx}^l$.

Note also that both the coefficient $K^l$ and the propagation time $\tau_{tx\_rx}^l$ to depend on the branch index l. Indeed, since the phase centre of each radiator of the corresponding branch is at a different position, the corresponding distance between the phase centre of this radiator and the phase centre of the receiver antenna is different, and consequently also the related free space propagation losses and propagation time.

The corresponding output of the receiver antenna is correlated with the PRN sequence dedicated for the $l^{th}$ branch in order to evaluate the contribution of this branch to the group delay and the losses.

$$X^l(\tau) = \frac{1}{NT_c} \int_0^{T_c} Y(u) \cdot \left( \sum_{i=1}^N c_i^l p_{cal}(u - iT_c - \tau) \right) du$$

$$= \frac{1}{NT_c} \int_0^{T_c} \left[ \sum_{l=1}^M \left\{ \begin{array}{l} \rho^l B_{Tx}^l e^{j[2\pi\omega_c(u-\tau^l-\tau_{tx\_rx}^l)+\phi_{Tx}^l]} \cdot s(t-\tau^l-\tau_{tx\_rx}^l) \cdot p_s(u-\tau^l-\tau_{tx\_rx}^j) + \\ \left( \sum_{i=1}^N \rho^l B_{cal}^l e^{j[2\pi\omega_c(u-\tau^l-\tau_{tx\_rx}^l)+\phi_{Tx}^l]} c_i^l p_{cal}(u-iT_c-\tau^l-\tau_{tx\_rx}^l) \right) \end{array} \right\} \right]$$

$$\left( \sum_{i=1}^N c_i^l p_{cal}(u-iT_c-\tau) \right) du.$$

From the previous conditions 1, 4, 5 and 6 the resulting maximal value of the correlator output achieved at delay time $\tau_{max} = \tau^l + \tau_{tx\_rx}^l$ is equal to:

$$X^l(\tau^l + \tau_{tx\_rx}^l) = B_{cal}^l \rho^l e^{j\phi_{Tx}^l}$$

The estimation of the delay time $\tau_{max}$ can be achieved, for example, with a delay lock loop (DLL).

Since the three following parameters: the amplitude of the test signal, $A_{cal}^l$, the expected value of the amplitude for the excitation coefficient, $A_{Tx}^l$, and finally the free space propagation losses (represented by $K^l$) are known, the path loss for the $l^{th}$ branch, $\rho^l$ can be deduced from the peak amplitude of the correlator output.

Since the propagation time $\tau_{\alpha\_n}^l$ is known from on-ground calibration and the reference time of the correlator unit (replica generator) is linked to the reference time of the useful signal generation unit ("time information exchange" link on FIG. 1), it is possible to deduce the group delay $\tau^l$, from the time corresponding to the correlation peak.

Finally the evaluation of the phase of the correlation output for the time delay at correlation peak enables to deduce the phase of the excitation coefficient for the $l^{th}$ branch. This phase estimation can be achieved for example with a phase lock loop (PLL) coupled with the delay lock loop (DLL).

In the following, some points related to the feasibility of the concept for the array antenna calibration are identified. The corresponding points are briefly discussed.

If the receiver antenna onboard a satellite is not at a sufficient distance from the transmitter antenna, typically a few meters, then it is not placed in the far field conditions. Therefore, it is not possible to use the so-called grating lobes of the antenna diagram. Here, the near-far properties are used, and the antenna aperture coupling parameter will be used in order to relate the power of the received signal with this of the transmit signal.

In case of a finite bandwidth, it will be necessary to find a set of pulse shapes for the chips of the pseudo-random sequence which show a pulse cross correlation equal to zero with the pulse shape for the symbol. If the corresponding pulse correlations are not zero, a sensitivity analysis will be necessary to see if the corresponding remaining contribution will not degrade the parameter estimation performances. In the case of a finite bandwidth, it is possible that the amplitude for each chip may be different: $A_{cal,i}^l \neq A_{cal,i+k}^l$ for $k \neq i$ in order to improve the corresponding performance.

Figure 4:
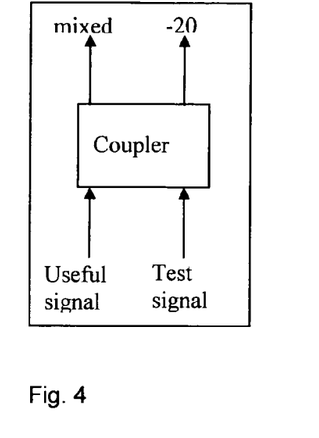
FIG. 4 shows an embodiment of a coupler to avoid a feedback from test to the transmission chain of the useful signal according to the invention.

Since, the useful and test signals can be mixed at RF, it is possible to consider for the test signal a bandwidth large enough to generate a pulse shape with much less ripples than the useful signal. Due to its higher bandwidth this test signal is more flexible and adaptable to get a much better pulse orthogonality. Couplers can be used to mix at RF both useful and test signals and avoid any feedback from test signal onto the useful signal transmission chain. An embodiment of such a coupler is shown in FIG. 4.

Figure 5:
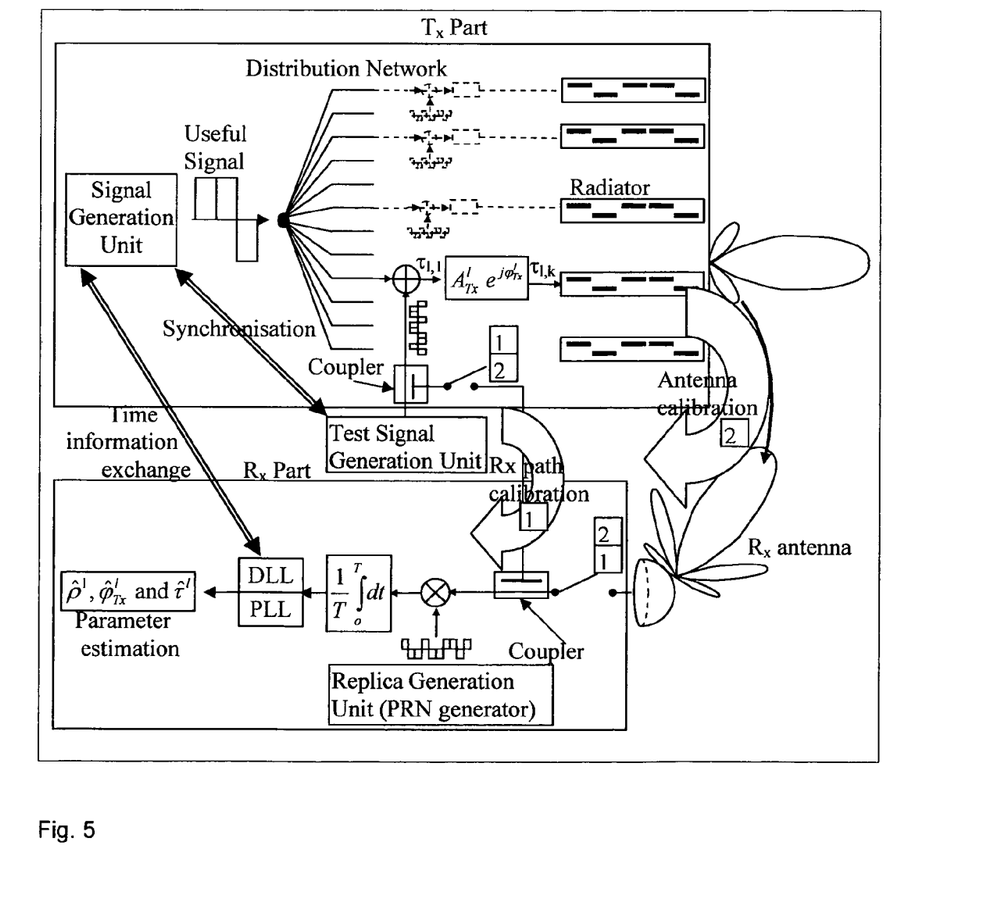
FIG. 5 shows an embodiment of the use of the calibration of the Tx and Rx paths in order to calibrate the characteristics (group delay, attenuation, phase shift) of the Rx path.

As far as the losses and propagation delay of the elements for the receiver path are concerned, two options may be considered:

Either the corresponding effects (delay, losses, phase shift) are considered to be negligible, or it is important to estimate and calibrate them. This calibration can be done on-ground. However it is also thinkable to consider an additional calibration phase of the receiver path to be done on-flight. For this purpose, an additional connection between the TSGU (Test Signal Generation Unit) of the test signals and the correlator input is created, as shown in FIG. 5. Then a switching is done sequentially between the calibration path of the antenna array (reference numeral 1 in FIG. 5) and the receiver or measurement path (reference numeral 2 in FIG. 5).

The distance between the transmitter and receiver antenna should be determined with a very accurate way in order to be taken into the parameter estimation algorithm, and of course not to degrade the corresponding performance. This may be for example solved by an exact measurement of the distance between the phase centres of the radiator and receiver antennae, and the deduction of the corresponding propagation time, $\tau_{\alpha\_n}^l$ and the free space propagation losses represented by $K^l$.

A further aspect is to synchronise as perfectly as possible the replica with the incoming signal at the receiver output in order to be at the "peak" of the auto-correlation function. A delay lock loop can be used to track the received signal for this purpose. Indeed, the thermal noise and the corresponding tracking code phase errors should be very small.

Since the output signal must be band limited in order to be compliant with some regulatory issues (for example: an overlapping with the Astronomic frequency bands has to avoided), the additive calibration or test signal should also be limited with the same bandwidth. This may strongly affect the quality of the pulse $p_{cal}(t)$ whose spectral spread should be much larger than the spectral spread of the pulse symbol, $p_s(t)$ in order to fulfil the orthogonality condition between the pulse shape and the pseudo-random sequence. For example, $p_s(t)$ could be spread with a RECT(l), whose spectral content would correspond to 8 MHz, while $p_{cal}(t)$ would be a RECT (36), whose spectral content would correspond to at least 100 MHz. Therefore, if the band limitation of the payload has to be applied (e.g. 40 MHz for Galileo) the corresponding pulse correlation would not be zero and this could affect the calibration accuracy. It should be noted that if the amplitude for the calibration pulse is very small (and consequently may be compliant with regulatory issues), it may be possible to send the test signal without band limitation together with the useful signal, and without injuring the radio frequency compatibility with other services (like Astronomy applications). However another alternative concept, considering that the test signal has the same transmit bandwidth as the useful signal, has been still considered and is presented in the next sections.

Alternative concept when test signal bandwidth is equal to the useful signal bandwidth.

When reviewing the principle for the calibration procedure proposed previously, it appears that an important point is related to the fulfillment of the "ideally" zero correlation between test signals with different pseudo-random sequences and the "ideally" zero correlation between each pseudo-random sequence of the test signal and the pulse shape of the useful signal (see FIG. 3). Note that this former orthogonality may be difficult to achieve when the transmission bandwidth is not large enough or when the test signal bandwidth has to be equal to the useful signal bandwidth. To summarise, two orthogonalities are necessary:

Code orthogonality (condition 5)
Pulse orthogonality (condition 6)

An alternative concept consists to only retain the code orthogonality to achieve the calibration. This concept can be applied especially for systems which use spread spectrum signals like for example Global Satellite Navigation Systems, where the useful signals are modulated with pseudo-random sequences. In this case, test signals have to fulfil the following conditions (starting index counting for the new conditions from 8):

8. The test signal has the same pulse shape than the symbol ($p_{cal}$=$p_s$(t) and therefore $T_c$=$T_s$)
3. The test signal has an amplitude much smaller than the useful signal (condition 3 from the baseline calibration concept)
4. The test signal is spread with a PN sequence which is orthogonal to the pseudo-random sequences for the calibrations of the other paths (condition 5 from the baseline calibration concept).
   9. The test signal is spread with a PN sequence which is orthogonal to the pseudo-random sequence of the useful signal The principle for the alternative concept is depicted on the FIG. 6.

Figure 6:
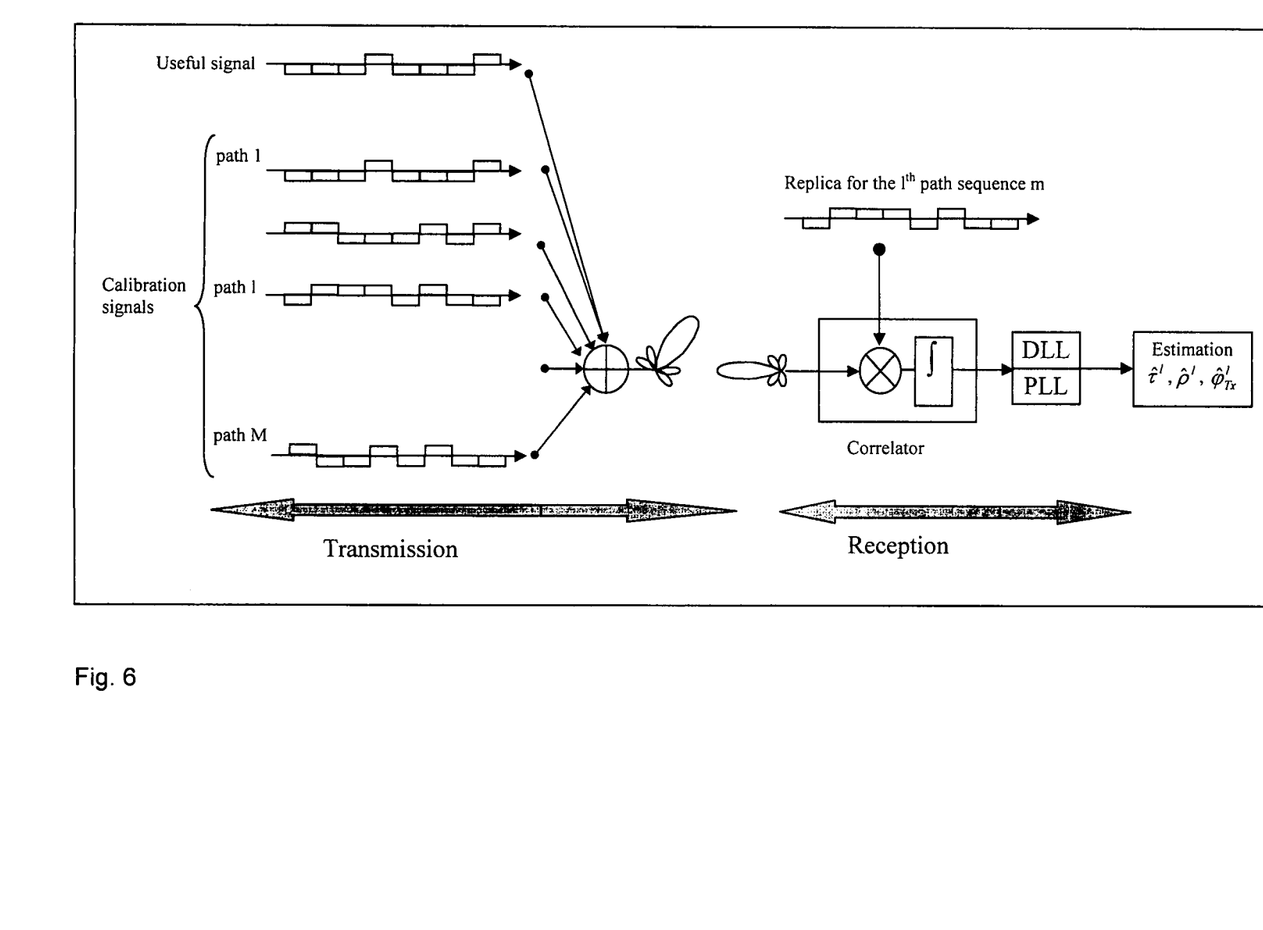
FIG. 6 shows an embodiment of an alternative concept for the calibration according to the invention, in case the bandwidth of the test signal has to be identical to this of the useful signal.

Hence, during the transmission of each pulse of the useful signal, the signal at the output of the antenna $$Z(t) = \sum_{l=1}^{M} \left\{ \begin{array}{l} \{\rho^l A_{Tx} A_{Tx}^l e^{j[2\pi\omega_c(t-\tau^l)+\varphi_{Tx}^l]} \cdot \sum_{k=1}^{N} c_k \cdot p_s(t - kT_c - \tau^l)\} + \ldots \\ \sum_{i=1}^{N} \{\rho^l A_{cal}^l A_{Tx}^l e^{j[2\pi\omega_c(t-\tau^l)+\varphi_{Tx}^l]} \sum_{i=1}^{N} c_i^l \cdot p_{cal}(t - iT_c - \tau^l)\} \end{array} \right\}$$

One more time, this signal will be transmitted through the array antenna and received at the receiver antenna.

By applying the same methodology as this described for the baseline calibration principle, the received signal will be correlated with a replica which is dedicated to the $l^{th}$ branch of the array. From the condition 9, the contribution from the useful signal to the correlator output will disappear. The contribution from the other calibration sequences will also disappear, from condition 5. Therefore the ACF peak will have the following value:

$$X^l(\tau^l + \tau_{tx\_rx}^l) = B_{cal}^l \rho^l e^{j\Phi_{Tx}^l}$$

By processing the amplitude and phase of this correlation peak, and by measuring the time delay corresponding to this peak and comparing it to the time reference of the useful signal generation unit, it will be possible to derive the phase and amplitude for the $l^{th}$ branch of the array antenna together with the propagation time within this $l^{th}$ branch. This has already been described in the baseline calibration principle.

The main challenge for this second concept of calibration will consist in determining N pseudo-random sequences which are exactly orthogonal between each other and also with the pseudo-random sequence for the useful signal. Normally, only one pseudo-random sequence is allocated per signal and satellite in the case of Global Satellite Navigation Systems. Furthermore, since this orthogonality has to be achieved for only one delay (synchronous CDMA (Code Division Multiple Access)) enough degrees of freedom offered by the length of the pseudo-random sequences should enable to design such a set of pseudo-random sequences for the calibration.

The invention claimed is:

1. A method for calibrating an array antenna having a plurality of branches comprising:
   generating a test signal using a pseudo-random sequence assigned to one of the plurality of branches for each of the plurality of branches;
   adding the test signals to a useful signal of the antenna so as to form a summed signal emitted via the array antenna;
   receiving the summed signal with a receiver antenna;
   correlating the received summed signal with a replica of the pseudo-random sequence so as to produce a correlation result using a correlator;
   estimating a characteristic of one of the plurality of branches by processing the correlation result;
   calibrating the antenna based on the estimated characteristic; and
   deducing a delay and losses and a phase shift in a receiver path starting from an output of the receiver antenna to an input of the correlator, the deducing including:
      switching the pseudo-random sequence to an input of the receiver path,
      correlating the pseudo-random sequence, switched to the input of the receiver path, with a replica of the pseudo-random sequence, and
      deducing the delay and losses and phase shift in the receiver path by processing the correlation result.

2. The method as recited in claim 1, further comprising selecting the pseudo-random sequences such that a cross-correlation between the pseudo-random sequences and the useful signal is almost zero.

3. The method as recited in claim 2, wherein the distribution network includes M branches and a pseudo-random sequence includes N chips, wherein N>M.

4. The method as recited in claim 3, further comprising selecting the pseudo-random sequences from one of a Walsh family of pseudo-random sequences and a family of pseudo-random sequences based on a use of m-sequences.

5. The method as recited in claim 3, wherein the useful signal includes symbols to be transmitted and each one of the N chips includes a chip duration, and further comprising selecting a symbol duration of the useful signal as a multiple of the chip duration.

6. The method as recited in claim 5, further comprising synchronizing a leading edge of a first chip of the N chips with a leading edge of a pulse so as to modulate a symbol of the useful signal.

7. The method as recited in claim 1, further comprising selecting a power of the test signals such that it is negligible compared to a power of the useful signal.

8. The method as recited in claim 7, further comprising selecting an amplitude of the: N chips such that it is much smaller than an amplitude of the useful signal.

9. The method as recited in claim 1, further comprising selecting a balanced pseudo-random sequence as a pseudo-random sequence, the balanced pseudo-random sequence including as many +1 chips as −1 chips.

10. The method as recited in claim 3, wherein the correlating includes synchronizing a first chip of the replica with a first chip of the N chips and providing the received sum signal to a correlation unit.

11. The method as recited in claim 1, further comprising selecting the pseudo-random sequence such that a cross-correlation between different pseudo-random sequences is negligible when a first chip of all pseudo-random sequences starts at nearly the same time and a shape of a pulse of the useful signal leads to a zero or negligible cross-correlation with the pseudo-random sequences when synchronized.

12. The method as recited in claim 1, further comprising selecting a test signal such that a bandwidth of the test signal is limited with a bandwidth of the useful signal to be emitted.

13. The method as recited in claim 1, further comprising selecting the test signal such that the test signal includes pulses having a pulse shape the same as a pulse shape of the useful signal and selecting the pseudo-random sequence to be orthogonal to the pseudo-random sequence assigned to other branches and to the pseudo-random sequence assigned to the useful signal.

14. The method as recited in claim 1, wherein the adding includes mixing the test signals and the useful signal at RF using a coupler to as to avoid any feedback from the test signals into a transmission chain of the useful signal.

15. The method as recited in claim 1, wherein the receiver antenna is disposed close to the array antenna such that aperture cooling between the array antenna and the receiver antenna, and wherein the correlating includes using the aperture cooling so as to obtain sufficient power of the summed signal so as to further process the summed signal.

16. The method as recited in claim 2, wherein the receiver antenna is disposed in approximately the same plane as the array antenna and points in approximately the same direction of the array antenna so as to prevent a perturbation of a radiation characteristic of the array antenna.

17. A device for calibrating an array antenna comprising:
a test signal generation unit configured to generate a test signal using a pseudo-random sequence assigned to a branch of a distribution network, wherein the array includes a plurality of branches;
adders for each of the plurality of branches configured to add the generated test signal to a useful signal to be emitted as a summed signal via the array antenna;
a receiver antenna configured to receive the summed signal;
a replica generator configured to generate a replica of the pseudo-random sequence; and
a processing device configured to correlate the summed signal with the generated replica so as to produce a correlation result using a correlator and so as to estimate characteristics of the branch through processing the correlation result and so as to calibrate the antenna based on the estimated characteristic,
wherein the device is configured to deduce a delay and losses and a phase shift in a receiver path starting from an output of the receiver antenna to an input of the correlator, the deducing including:
switching the pseudo-random sequence to an input of the receiver path,
correlating the pseudo-random sequence, switched to the input of the receiver path, with a replica of the pseudo-random sequence, and
deducing the delay and losses and phase shift in the receiver path by processing the correlation result.

18. The device, as recited in claim 17, wherein a signal path is configured to switch between the test signal generation unit and a path of the receiver antenna starting at an output of the receiver antenna.

* * * * *